United States Patent
Tan et al.

(10) Patent No.: US 11,934,788 B2
(45) Date of Patent: Mar. 19, 2024

(54) ENCODING METHOD, APPARATUS, AND STORAGE MEDIUM

(71) Applicant: TENCENT TECHNOLOGY (SHENZHEN) COMPANY LIMITED, Shenzhen (CN)

(72) Inventors: Yizhang Tan, Shenzhen (CN); Shuo Sun, Shenzhen (CN); Jie Cao, Shenzhen (CN); Le Tian, Shenzhen (CN); Cheng Niu, Shenzhen (CN); Jie Zhou, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 461 days.

(21) Appl. No.: 17/350,752

(22) Filed: Jun. 17, 2021

(65) Prior Publication Data
US 2021/0312137 A1 Oct. 7, 2021

Related U.S. Application Data

(63) Continuation of application No. PCT/CN2020/073376, filed on Jan. 21, 2020.

(30) Foreign Application Priority Data

Jan. 24, 2019 (CN) .......................... 201910069752.6

(51) Int. Cl.
*G06F 40/30* (2020.01)
*G06F 40/126* (2020.01)
(Continued)

(52) U.S. Cl.
CPC ............ *G06F 40/30* (2020.01); *G06F 40/126* (2020.01); *G06F 40/279* (2020.01); *G06F 40/151* (2020.01); *G10L 15/16* (2013.01)

(58) Field of Classification Search
CPC .... G06F 40/30; G06F 16/3347; G06F 40/279; G06F 40/289; G06F 40/126;
(Continued)

(56) References Cited

U.S. PATENT DOCUMENTS 9,336,192 B1 * 5/2016 Barba .................... G06F 40/284
10,332,508 B1 * 6/2019 Hoffmeister ............. G06N 3/08
(Continued)

FOREIGN PATENT DOCUMENTS

| CN | 104915448 | 9/2016 |
|----|-----------|--------|
| CN | 106919646 | 7/2017 |

(Continued)

OTHER PUBLICATIONS

Long et al., "A Knowledge enhanced generative conversational service agent", Proceedings of the 6th Dialog System Technollogy Challenges (DSTC6) Workshop, 7 pages , 2017. (Year: 2017).*
(Continued)

*Primary Examiner* — Vijay B Chawan
(74) *Attorney, Agent, or Firm* — Crowell & Moring LLP

(57) ABSTRACT

Embodiments of this disclosure include an encoding method and apparatus. The encoding may include obtaining a target paragraph and a context sentence of the target paragraph, and inputting the target paragraph and the context sentence into a memory encoding model. The encoding may further include obtaining an original vector set and a memory vector set in the input layer and obtaining a first target sentence matrix of the original vector set in the memory layer according to the original vector set and the memory vector set. The encoding may further include obtaining a paragraph vector of the target paragraph in the output layer according to the first target sentence matrix and performing processing based on the paragraph vector.

19 Claims, 9 Drawing Sheets

(51) Int. Cl.
  *G06F 40/279* (2020.01)
  *G06F 40/151* (2020.01)
  *G10L 15/16* (2006.01)

(58) Field of Classification Search
  CPC ... G06F 40/151; G10L 15/16; G10L 15/1815;
      G10L 15/183; G10L 15/19; G10L
      15/1822; G06N 3/044; G06N 3/045;
      G06N 3/08; G06N 5/04; G06N 20/10;
      G06N 3/02
  See application file for complete search history.

(56) References Cited

U.S. PATENT DOCUMENTS

| | | | | |
|---|---|---|---|---|
| 2004/0068396 | A1* | 4/2004 | Kawatani | G06F 16/3347 707/E17.08 |
| 2016/0350653 | A1* | 12/2016 | Socher | G06N 5/04 |
| 2017/0200077 | A1* | 7/2017 | Weston | G06F 40/279 |
| 2018/0082197 | A1* | 3/2018 | Aravamudan | G16B 50/10 |
| 2018/0189272 | A1* | 7/2018 | Noh | G06N 3/045 |
| 2018/0336183 | A1* | 11/2018 | Lee | G06N 5/022 |
| 2018/0357225 | A1* | 12/2018 | Liu | H04L 51/02 |
| 2020/0044993 | A1* | 2/2020 | Wu | G06F 40/274 |
| 2021/0073459 | A1* | 3/2021 | McCann | G06F 40/47 |
| 2021/0312137 | A1* | 10/2021 | Tan | G06F 40/126 |
| 2021/0319167 | A1* | 10/2021 | Tan | G06F 16/3347 |

FOREIGN PATENT DOCUMENTS

| | | |
|---|---|---|
| CN | 107229684 | 10/2017 |
| CN | 108614855 | 10/2018 |
| CN | 108694225 | 10/2018 |
| CN | 109241536 | 1/2019 |
| CN | 110147533 | 8/2019 |
| JP | 2017-060182 | 3/2017 |
| KR | 20180071021 | 6/2018 |
| WO | WO 2018/142207 | 8/2018 |
| WO | WO2018/165932 | 9/2018 |

OTHER PUBLICATIONS

English translation of International Search Report dated Apr. 17, 2020 in International Application No. PCT/CN2020/073376.
Japanese Notice of Reasons for Refusal dated May 30, 2022 in corresponding Japanese Patent Application No. 2021-516370 with English translation.
RAN WG2 LS on inclusion of selected PLMN into the complete message [online], 3GPP TSG RAN WG2 #103 R2-1813424 Internet<URL:http://www.3gpp.org/ftp/tsg_ran/WG2_RL2/TSGR2_103/Docs/R2-1813424.zip>, Aug. 20, 2018.
Rapporteur (Qualcomm Incorporated), Miscellaneous Corrections [online], 3GPP TSG RAN WG2 #103 R2-1811861, Internet<URL:http://www.3gpp.org/ftp/tsg_ran/WG2_RL2/TSGR2_103/Docs/R2-1811861.zip>, Aug. 20, 2018.
Ericsson, Size of MSG3 in NR[online], 3GPP TSG RAN WG2 #101 R2-1802638, Internet<URL:http://www.3gpp.org/ftp/tsg_ran/WG2_RL2/TSGR2_101/Docs/R2-1802638.zip>, Feb. 26, 2018.
Nokia, Nokia Shanghai Bell, Consideration on RRC_INACTIVE state handling[online], 3GPP TSG RAN WG2 #103 R2-1812397, Internet<URL:http://www.3gpp.org/ftp/tsg_ran/WG2_RL2/TSGR2_103/Docs/R2-1812397.zip>, Aug. 20, 2018.
LG Electronics Inc., Using spare bits in Establishment Cause and Resume Cause[online], 3GPP TSG RAN WG2 adhoc_2018_07_NR R2-1810725, Internet<URL:http://www.3gpp.org/ftp/tsg_ran/WG2_RL2/TSGR2_AHs/2018_07_NR/Docs/R2-1810725.zip>, Jul. 2, 2018.
Qualcomm Incorporated, Discussion paper on PLMN mismatch during 5GMM-Connected mode with RRC inactive indication[online], 3GPP TSG CT WG1 #112bis C1-186351, InternetURL:https://www.3gpp.org/ftp/tsg_ct/WG1_mm-cc-sm_ex-CN1/TSGC1_112bis_Vilnius/Docs/C1-186351.zip, Oct. 7, 2018.
Japanese Decision to Grant a Patent dated Jan. 4, 2023 in corresponding Japanese Patent Application No. 2021-516730 with English translation.
Japanese Notice of Reasons for Refusal dated Jun. 13, 2022 in corresponding Japanese Patent Application No. 2021-516730 with English translation.

* cited by examiner

ENCODING METHOD, APPARATUS, AND STORAGE MEDIUM

CROSS-REFERENCE TO RELATED APPLICATIONS

This application is a continuation application of PCT Patent Application No. PCT/CN2020/073376, filed on Jan. 21, 2020, which claims priority to Chinese Patent Application No. 2019100697526, entitled "ENCODING METHOD, APPARATUS, AND DEVICE, AND STORAGE MEDIUM" and filed with the National Intellectual Property Administration, PRC on Jan. 24, 2019, wherein the content of each of the above-referenced applications is incorporated herein by reference in its entirety.

FIELD OF THE TECHNOLOGY

This disclosure relates to the field of natural language processing, and in particular, to an encoding method, apparatus, device, and a storage medium.

BACKGROUND OF THE DISCLOSURE

Encoding is a process of converting text into an encoding value to obtain a vector with which the meaning of the text can be accurately described. The text can be converted through encoding into a vector form convenient for calculation and processing, which has been widely applied to various fields such as sentence selection and sentence generation currently.

At present, a hierarchical encoding scheme is proposed. When a target paragraph including a plurality of sentences is to be encoded, a word vector of each word in each sentence in the target paragraph is obtained. For each sentence in the target paragraph, the word vector of each word in the sentence is encoded into a vector using a first encoding model based on a word level, to obtain a sentence vector of the sentence, and to obtain sentence vectors of the plurality of sentences in the target paragraph. Next, the sentence vectors of the plurality of sentences are encoded into a vector using a second encoding model based on a sentence level, to obtain a paragraph vector of the target paragraph.

In the foregoing scheme, the word vectors of each sentence in the target paragraph are sequentially encoded respectively in only a serial manner, and the plurality of sentence vectors are then encoded in the serial manner. In this case, the encoding speed is relatively slow.

SUMMARY

According to various embodiments provided in this disclosure, an encoding method, apparatus, and device, and a storage medium are provided in this disclosure. The specific technical solutions are as follows:

In one embodiment, an encoding method performed by an encoding device is disclosed. The method may include obtaining a target paragraph and a context sentence of the target paragraph and inputting the target paragraph and the context sentence into a memory encoding model. The target paragraph may include at least one sentence. The memory encoding model may include an input layer, a memory layer, and an output layer. The method may further include obtaining an original vector set and a memory vector set of the target paragraph in the input layer. The original vector set may include a sentence vector of each sentence in the target paragraph. The memory vector set may include a word vector of each word in the context sentence of the target paragraph. The method may further include obtaining a first target sentence matrix of the original vector set in the memory layer according to the original vector set and the memory vector set. The first target sentence matrix may describe the target paragraph according to an association relationship between the original vector set and the memory vector set. The method may further include obtaining a paragraph vector of the target paragraph in the output layer according to the first target sentence matrix and processing the paragraph vector.

In another embodiment, an encoding apparatus is disclosed. The encoding apparatus may include a memory operable to store computer-readable instructions and a processor operable to read the computer-readable instructions. When executing the computer-readable instructions, the processor is configured to obtain a target paragraph and a context sentence of the target paragraph and input the target paragraph and the context sentence into a memory encoding model. The target paragraph may include at least one sentence. The memory encoding model may include an input layer, a memory layer, and an output layer. The processor is further configured to obtain an original vector set and a memory vector set of the target paragraph in the input layer. The original vector set may include a sentence vector of each sentence in the target paragraph. The memory vector set may include a word vector of each word in the context sentence of the target paragraph. The processor is further configured to obtain a first target sentence matrix of the original vector set in the memory layer according to the original vector set and the memory vector set. The first target sentence matrix may describe the target paragraph according to an association relationship between the original vector set and the memory vector set. The processor is further configured to obtain a paragraph vector of the target paragraph in the output layer according to the first target sentence matrix and process the paragraph vector.

In another embodiment, a non-transitory computer-readable storage medium having processor executable instructions stored thereon is disclosed. The instructions may cause a processor to obtain a target paragraph and a context sentence of the target paragraph and input the target paragraph and the context sentence into a memory encoding model. The target paragraph may include at least one sentence. The memory encoding model may include an input layer, a memory layer, and an output layer. The instructions may cause the processor to obtain an original vector set and a memory vector set of the target paragraph in the input layer. The original vector set may include a sentence vector of each sentence in the target paragraph. The memory vector set may include a word vector of each word in the context sentence of the target paragraph. The instructions may cause the processor to obtain a first target sentence matrix of the original vector set in the memory layer according to the original vector set and the memory vector set. The first target sentence matrix may describe the target paragraph according to an association relationship between the original vector set and the memory vector set. The instructions may cause the processor to obtain a paragraph vector of the target paragraph in the output layer according to the first target sentence matrix and process the paragraph vector.

Details of one or more embodiments of this disclosure are provided in the accompanying drawings and descriptions below. Based on the specification, the accompanying drawings, and the claims of this disclosure, other features, objectives, and advantages of this disclosure become more obvious.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from the accompanying drawings without creative efforts.

DESCRIPTION OF EMBODIMENTS

To make the objectives, technical solutions, and advantages of this disclosure clearer, implementations of this disclosure are further described below in detail with reference to the accompanying drawings.

The embodiments of this disclosure provide a memory encoding model. A target paragraph and a context sentence of the target paragraph are obtained and inputted into the memory encoding model. The target paragraph may be encoded using the memory encoding model, to obtain a paragraph vector of the target paragraph, thereby processing the paragraph vector. During the encoding, the target paragraph may be used as a unit. The target paragraph is encoded using the memory encoding model once. Each sentence in the target paragraph does not need to be encoded respectively in a serial manner. Moreover, not only the meaning of each sentence in the target paragraph is considered, but also an association relationship between the sentence in the target paragraph and the context sentence of the target paragraph is considered, so that the meaning of the target paragraph can be expressed more accurately using an obtained paragraph vector, and the accuracy can be improved during the processing of the paragraph vector.

Figure 1:
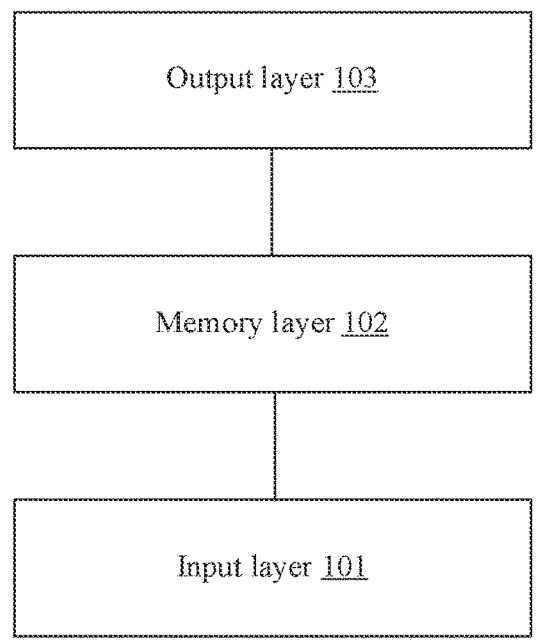
FIG. 1 is a schematic structural diagram of a memory encoding model according to an embodiment of this disclosure.

Referring to FIG. 1, the memory encoding model includes an input layer 101, a memory layer 102, and an output layer 103. The input layer 101 is connected to the memory layer 102, and the memory layer 102 is connected to the output layer 103.

The input layer 101 extracts, according to each sentence in the target paragraph, a sentence vector representing the meaning of the sentence, to obtain an original vector set of the target paragraph, and inputs the original vector set into the memory layer 102. In addition, the input layer 101 may further obtain a word vector of each word according to each word in the context sentence of the target paragraph, form a memory vector set using a plurality of obtained word vectors, and input the memory vector set into the memory layer 102. The memory layer 102 obtains a first target sentence matrix according to the inputted original vector set and the inputted memory vector set, and inputs the first target sentence matrix into the output layer 103. The output layer 103 obtains the paragraph vector of the target paragraph according to the first target sentence matrix.

The memory layer 102 uses an attention learning mechanism, so that the memory layer can extract related information having relatively significant influence on the original vector set from the memory vector set. Therefore, a more accurate paragraph vector can be obtained by considering the association relationship between the sentence and the context sentence in the target paragraph.

Figure 2:
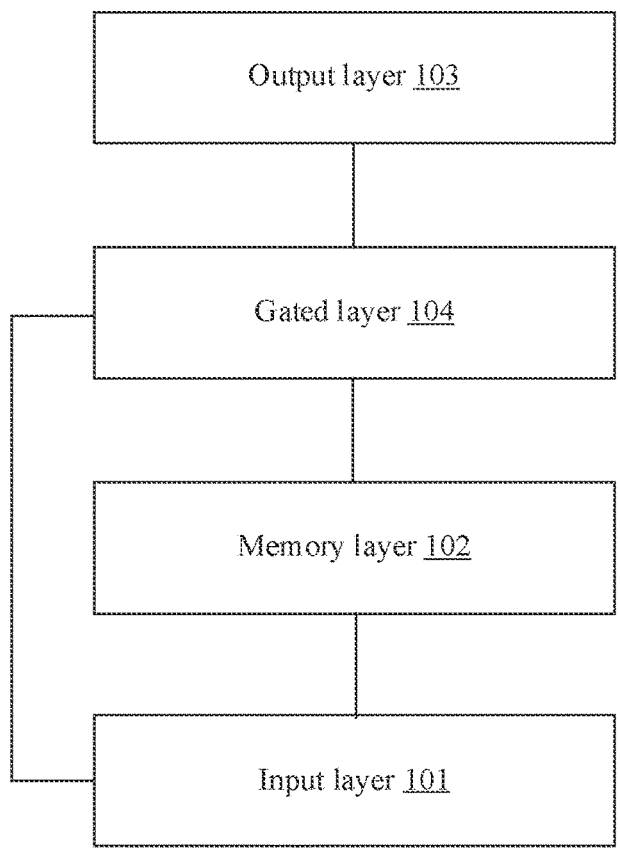
FIG. 2 is a schematic structural diagram of another memory encoding model according to an embodiment of this disclosure.

In an embodiment, referring to FIG. 2, the memory encoding model further includes a gated layer 104. The input layer 101 is connected to the memory layer 102 and the gated layer 104. The memory layer 102 is connected to the gated layer 104. The gated layer 104 is connected to the output layer 103. That is, an embodiment of this disclosure provides a gated self-attentive memory network (GSMN) model.

After obtaining the first target sentence matrix, the memory layer 102 inputs the first target sentence matrix into the gated layer 104. The gated layer 104 performs a weighted summation on the original vector set and the first target sentence matrix to obtain a second target sentence matrix, and inputs the second target sentence matrix into the output layer 103. The output layer 103 obtains the paragraph vector of the target paragraph according to the second target sentence matrix.

In an embodiment, a memory network model repeatedly runs the memory layer 102 and the gated layer 104, uses the second target sentence matrix outputted by the gated layer 104 as the original vector set and the memory vector set of the memory layer 102, re-inputs the second target sentence matrix into the memory layer 102, repeatedly runs the memory layer 102 and the gated layer 104 until a quantity of repetitions reaches a preset quantity, and inputs a current target sentence matrix into the output layer 103 to obtain the paragraph vector of the target paragraph. The quantity of repetitions may be 2 or 3, or may be another value.

This embodiment of this disclosure may be applied to a scenario in which any paragraph is encoded.

For example, in a scenario of a smart dialog, a user chats with a chat robot. The chat robot may obtain a text message inputted by the user as a target paragraph. Using the method provided in this embodiment of this disclosure, the robot encodes the target paragraph to obtain a paragraph vector, matches the paragraph vector with vectors of a plurality of reply messages in a corpus database, to obtain a reply message of which a vector matches the paragraph vector, and displays the reply message to the user, to realize an effect of a dialog between the user and the chat robot.

Because the text message inputted by the user and a context sentence of the text message may be considered during the encoding, a generated paragraph vector is relatively accurate, which enables the chat robot to better understand the meaning that the user wants to express. More matching reply messages can be obtained according to the paragraph vector, so that a reply better meeting a user requirement can be given for the text message inputted by the user, thereby improving the effect of the dialog.

Alternatively, in a scenario of text classification, a to-be-classified target paragraph is obtained. The target paragraph is encoded using the method provided in this embodiment of this disclosure to obtain a paragraph vector. Classification is performed according to the paragraph vector to determine a category to which the target paragraph belongs.

Because a context sentence of the target paragraph is considered during the encoding, a generated paragraph vector is relatively accurate, and the meaning of the target paragraph can be better understood. The classification is performed according to the paragraph vector to improve the classification accuracy.

Alternatively, in a scenario of paragraph selection, a plurality of to-be-selected target paragraphs are selected. Each target paragraph is encoded using the method provided in this embodiment of this disclosure to obtain a paragraph vector. A target paragraph meeting a requirement is selected from the plurality of target paragraphs according to the paragraph vectors of the plurality of target paragraphs.

Because a context sentence of the target paragraph is considered during the encoding, a generated paragraph vector is relatively accurate, and the meaning of the target paragraph can be better understood. Selection is performed according to the paragraph vector, to select a target paragraph that meets a requirement and avoid a problem of incorrect selection.

In addition to the foregoing scenarios, the method provided in this embodiment of this disclosure may also be applied to another scenario such as reading comprehension. This is not limited in this embodiment of this disclosure.

Figure 3:
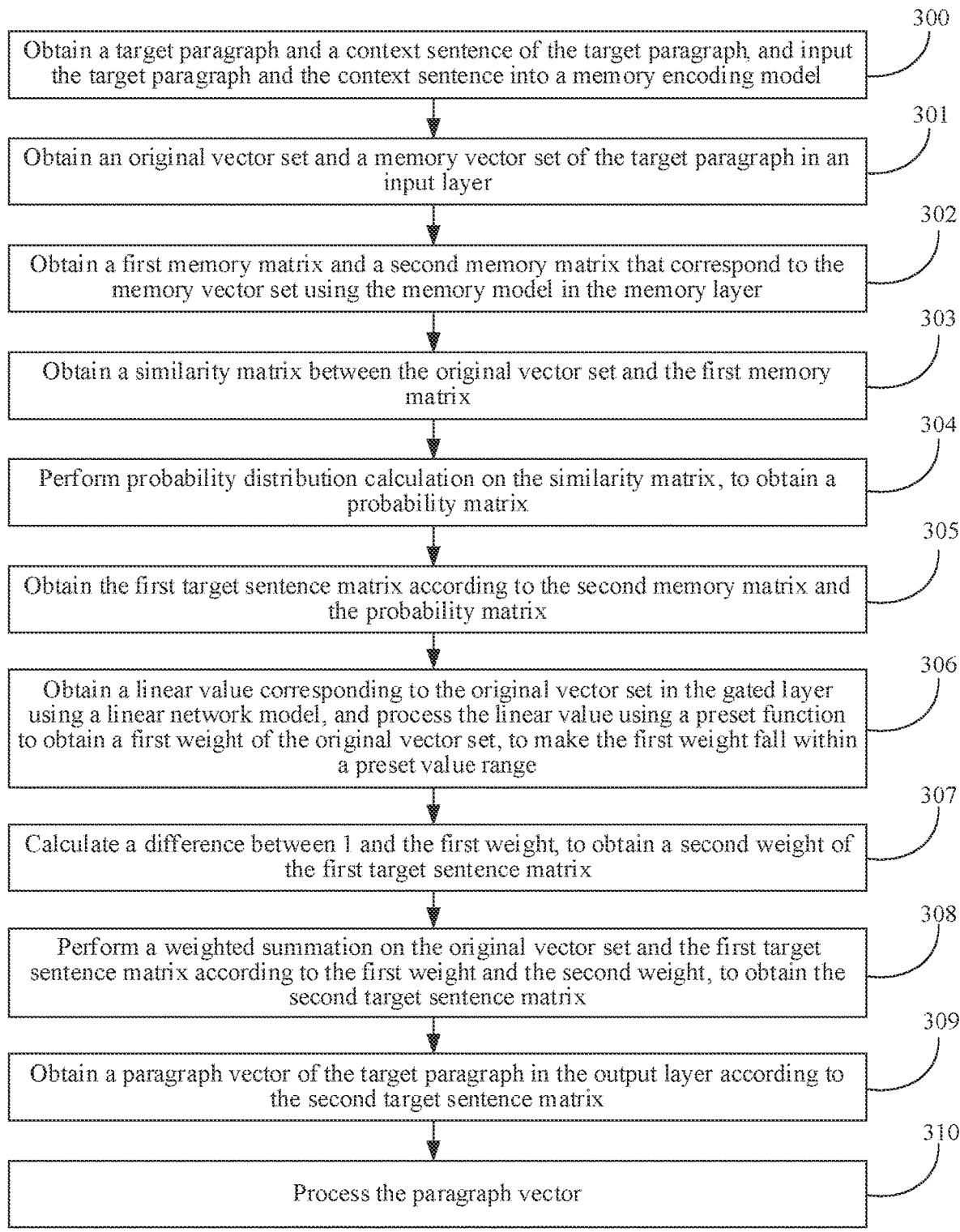
FIG. 3 is a flowchart of an encoding method according to an embodiment of this disclosure.

FIG. 3 is a flowchart of an encoding method according to an embodiment of this disclosure. A process of encoding a target paragraph by a memory encoding model is described in this embodiment of this disclosure. An execution body is an encoding device. The encoding device may be a server, or may be a terminal such as a mobile phone or a computer. Referring to FIG. 3, the method includes the following steps:

300: Obtain a target paragraph and a context sentence of the target paragraph, and input the target paragraph and the context sentence into a memory encoding model.

The target paragraph includes at least one sentence. Each sentence includes at least a word. The context sentence of the target paragraph may include a sentence in one or more paragraphs before the target paragraph or a sentence in one or more paragraphs after the target paragraph or may include one or more sentences in the target paragraph. For example, a context sentence of the target paragraph may be original text of the target paragraph.

In an embodiment, if the target paragraph is a paragraph in an article, the context sentence may include a sentence before or after the paragraph in the article, or may include a sentence in the paragraph. Alternatively, if the target paragraph is a piece of text inputted by the user in the scenario of the smart dialog, the context sentence may include text inputted by the user before the target paragraph or text in the target paragraph, or may include text replied by the chat robot to the user and before the target paragraph or the like.

If the target paragraph is encoded, the target paragraph and the context sentence of the target paragraph are obtained, and the target paragraph and the context sentence are inputted into the memory encoding model.

301: Obtain an original vector set and a memory vector set of the target paragraph in an input layer.

The input layer is the first layer in the memory encoding model. When the target paragraph is to be encoded, the target paragraph and the context sentence of the target paragraph are inputted into the input layer, and the target paragraph and the context sentence of the target paragraph are processed in the input layer to obtain the original vector set and the memory vector set of the target paragraph.

The original vector set includes a sentence vector of each sentence in the target paragraph. The memory vector set includes a word vector of each word in the context sentence of the target paragraph. In this embodiment of this disclosure, during the encoding of the target paragraph, not only the target paragraph needs to be considered, but also a context sentence of the target paragraph needs to be considered. Therefore, not only the original vector set needs to be obtained, but also the memory vector set needs to be obtained. Processing may be performed subsequently according to the original vector set and the memory vector set.

In an embodiment, step 301 may include the following steps 3011 and 3012:

3011: Obtain the sentence vector of each sentence according to a word vector of each word in each sentence in the target paragraph using the sentence encoding model, to obtain the original vector set.

First, the target paragraph is preprocessed. The preprocessing process includes: performing a sentence segmentation on the target paragraph to obtain each sentence in the target paragraph, and performing a word segmentation on each sentence to obtain each word in each sentence and obtain a word vector of each word.

In a process of the sentence segmentation, a punctuation mark, for example, a period, a question mark, or an exclamation mark, in the target paragraph, that can represent the end of a corresponding sentence may be obtained. The target paragraph is segmented according to the obtained punctuation mark to obtain a sentence in the target paragraph.

In a process of the word segmentation, a word segmentation algorithm may be used for segmenting each sentence. The word segmentation algorithm may include a plurality of algorithms such as a two-way maximum matching method and a minimum segmentation method. Alternatively, the word segmentation is performed in another manner.

In a process of obtaining the word vector, for each word, the word vector corresponding to the word may be queried according to a word vector dictionary. The word vector dictionary may include a correspondence between a word and a word vector. Alternatively, the word vector dictionary may be a word vector obtaining model such as a recurrent neural network model, a deep learning network model, or a convolutional neural network model. The word vector of the word may be obtained using the word vector obtaining model.

After the target paragraph is preprocessed, for each sentence, the word vector of each word in the sentence is processed using the sentence encoding model to obtain the sentence vector of the sentence, so that the sentence vector of each sentence in the target paragraph can be obtained. The original vector set is formed according to the sentence vector of each sentence.

The sentence encoding model is used for compressing word vectors of a plurality of words in any sentence into a sentence vector representing the meaning of the sentence. The sentence encoding model may be a recurrent neural network model, a deep learning network model, a convolutional neural network model, a transformation neural network model, a grounded semantic mapping network (GSMN) model based on a word level, or another type of model.

In an embodiment, the sentence encoding model includes a first sentence encoding submodel and a second sentence encoding submodel; and the process of obtaining the sentence vector of the sentence may include: obtaining, for each sentence in the target paragraph, the word vector of each word in the sentence, to obtain a plurality of word vectors; forward encoding the plurality of word vectors using the first sentence encoding submodel, to obtain a first vector, and backward encoding the plurality of word vectors using the second sentence encoding submodel, to obtain a second vector; and obtaining the sentence vector of the sentence according to the first vector and the second vector. The following operation is repeated, to obtain the sentence vector of each sentence in the target paragraph.

The first sentence encoding submodel is a forward encoding model. The second sentence encoding submodel is a backward encoding model. If the word vectors of the plurality of words in the sentence are arranged in sequence, the plurality of word vectors are forward encoded according to the arrangement sequence of the plurality of word vectors using the first sentence encoding submodel, to obtain the first vector; and the plurality of word vectors are processed backward using the second sentence encoding submodel, and the plurality of word vectors are then backward encoded according to an arrangement sequence after the backward processing, to obtain the second vector.

In addition, after the first vector and the second vector are obtained, the first vector and the second vector may be concatenated to obtain the sentence vector, or the first vector and the second vector may be added to obtain the sentence vector, or the sentence vector may be obtained in another manner.

Figure 4:
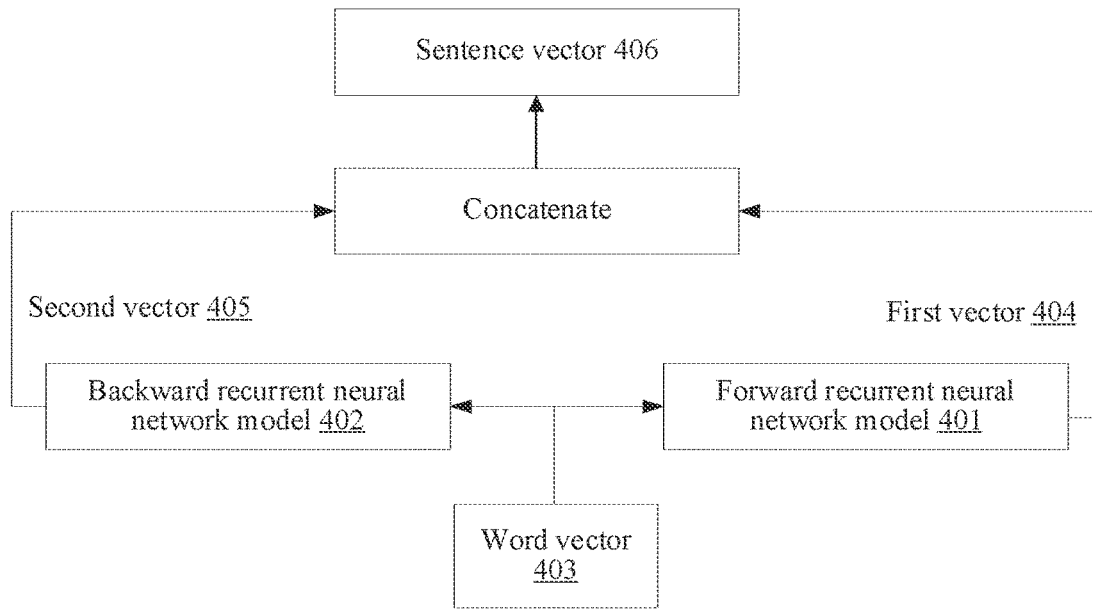
FIG. 4 is a schematic structural diagram of a sentence encoding model according to an embodiment of this disclosure.
Figure 5:
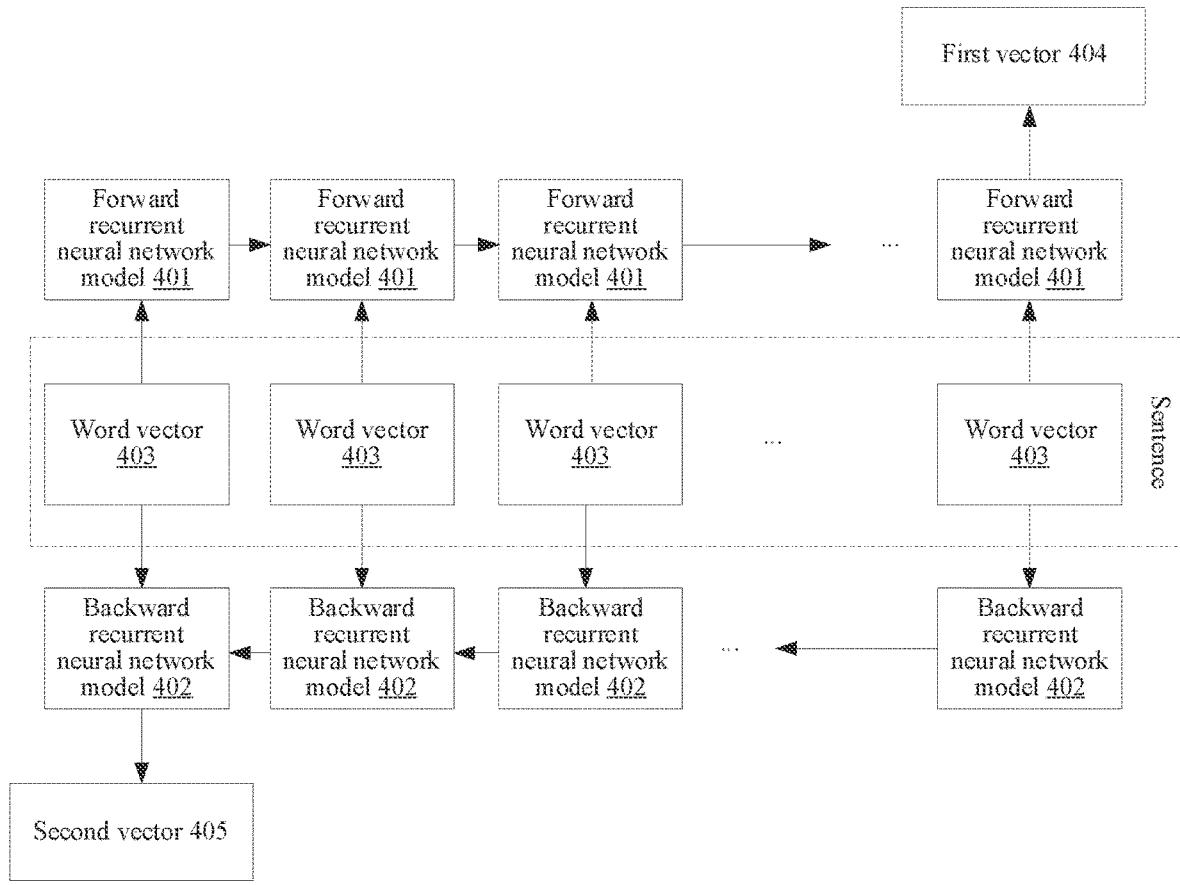
FIG. 5 is a schematic flowchart of a sentence encoding model according to an embodiment of this disclosure.

Description is made using an example in which the sentence encoding model is a bidirectional recurrent neural network model. As shown in FIG. 4 and FIG. 5, the bidirectional recurrent neural network model includes a forward recurrent neural network model 401 and a backward recurrent neural network model 402. The plurality of word vectors 403 of the sentence are forward encoded using the forward recurrent neural network model 401, to obtain the first vector 404. The plurality of word vectors 403 of the sentence are backward encoded using the backward recurrent neural network model 402, to obtain the second vector 405. The first vector 404 and the second vector 405 are concatenated to obtain the sentence vector 406 of the sentence.

3012: Obtain the memory vector set according to the word vector of each word in the context sentence.

Word segmentation is performed on the context sentence, to obtain each word in the context sentence, and the word vector of each word is then obtained. The memory vector set is formed according to the obtained word vector. Processes of performing word segmentation and obtaining the word vector of the word are similar to those in step 3011.

Figure 6:
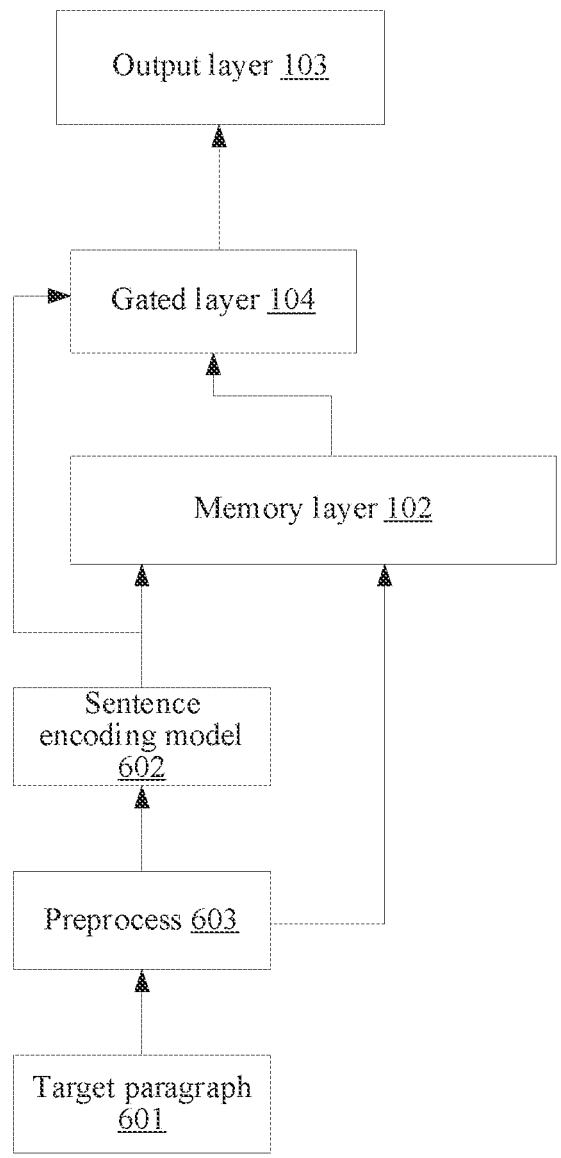
FIG. 6 is a schematic structural diagram of a memory encoding model according to an embodiment of this disclosure.

If the target paragraph is the same as the context sentence, the original vector set and the memory vector set can be obtained only by processing the sentence in the target paragraph without processing other sentences. As shown in FIG. 6, the memory vector set is obtained according to the word vector obtained after the target paragraph 601 is pre-processed at 603.

In this embodiment of this disclosure, the memory encoding model uses the target paragraph 601 as a unit for encoding. Therefore, the input layer inputs both the obtained original vector set and the obtained memory vector set into the memory layer for processing.

302: Obtain, using the memory model in the memory layer, a first memory matrix and a second memory matrix that correspond to the memory vector set.

The memory layer includes the memory model. The first memory matrix and the second memory matrix that correspond to the memory vector set may be obtained using the memory model. The first memory matrix and the second memory matrix are used for describing the memory vector set, and the first memory matrix and the second memory matrix may be the same or different.

For a manner of obtaining the first memory matrix, the word vector of each word in the context sentence may be obtained according to the memory vector set. The sentence vector of each sentence may be obtained using the sentence encoding model 602. The first memory matrix may be obtained according to the sentence vector of each sentence.

In an embodiment, the sentence encoding model 602 includes a third sentence encoding submodel and a fourth sentence encoding submodel. The process of obtaining the sentence vector of the sentence may include: obtaining, for each sentence in the context sentence, the word vector of each word in the sentence, to obtain a plurality of word vectors; forward encoding the plurality of word vectors using the third sentence encoding submodel, to obtain a third vector; backward encoding the plurality of word vectors using the fourth sentence encoding submodel, to obtain a fourth vector; and obtaining the sentence vector of the sentence according to the third vector and the fourth vector.

A specific process of obtaining the sentence vector is similar to that in step 3011.

After the sentence vector of each sentence in the context sentence is obtained, the sentence vectors of the sentences are combined to obtain the first memory matrix.

In addition, a manner of obtaining the second memory matrix is similar to the manner of obtaining the first memory matrix, and a difference only lies in that a used sentence encoding model may be the same as or different from a sentence encoding model used to obtain the first memory matrix.

Figure 7:
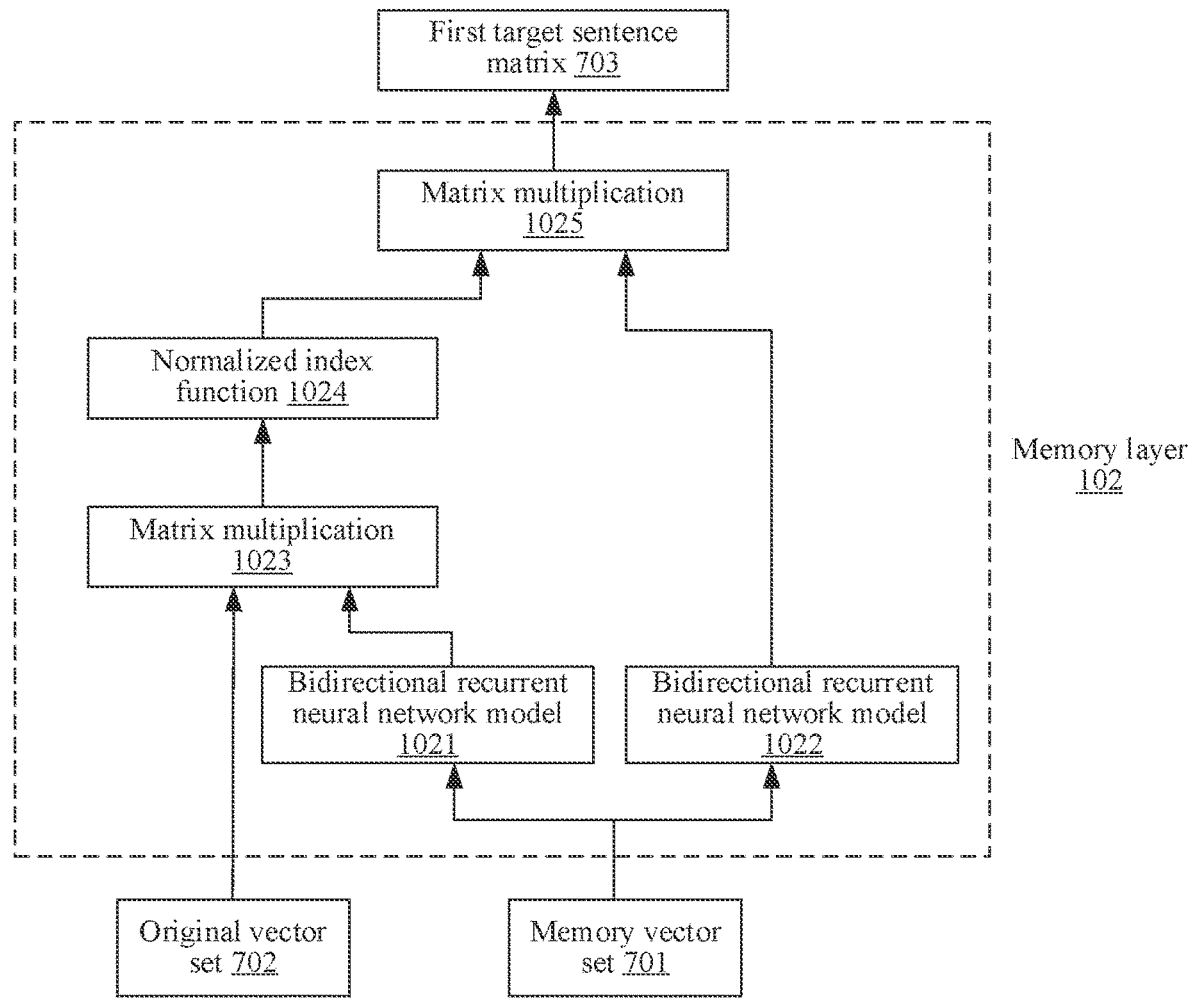
FIG. 7 is a schematic structural diagram of a memory layer according to an embodiment of this disclosure.

As shown in FIG. 7, both sentence encoding models used to obtain the first memory matrix and the second memory matrix are bidirectional recurrent neural network model. The memory vector set 701 is processed using the two bidirectional recurrent neural network models 1021 and 1022 respectively to obtain the first memory matrix and the second memory matrix. Parameters of the two bidirectional recurrent neural network models 1021 and 1022 may be the same or may be different. Therefore, the obtained first memory matrix and the obtained second memory matrix may be the same or may be different.

Because the memory vector set can be described using the first memory matrix and the second memory matrix, processing is performed according to the first memory matrix, the second memory matrix, and the original vector set, and the association relationship between the context sentence and the target paragraph can be considered, to describe the paragraph vector of the target paragraph more accurately.

In this embodiment of this disclosure, if an example in which the target paragraph and the context sentence are the same is used, the original vector set 702 and the memory vector set 701 are the same. In this case, steps 303 to 305 may be performed to obtain the first target sentence matrix used for describing the target paragraph. Certainly, where the target paragraph and the context sentence are different, the first target sentence matrix may be obtained in a plurality of manners.

303: Obtain a similarity matrix between the original vector set and the first memory matrix.

The similarity matrix is obtained in a plurality of manners, for example, a matrix multiplication manner and a matrix subtraction manner. In an embodiment, referring to FIG. 7, the sentence vectors in the original vector set 702 are combined to obtain an original sentence matrix of the target paragraph. A matrix obtained by multiplying the original sentence matrix by the first memory matrix at 1023 is used as the similarity matrix. Alternatively, a matrix obtained by multiplying the original sentence matrix by the transpose of the first memory matrix may be used as the similarity matrix.

Each value in the similarity matrix represents a similarity between a sentence in the original vector set and a corresponding sentence in the context sentence. A higher similarity indicates a closer association between the two sentences, and more attention is to be paid to the sentence in a subsequent processing process.

304: Perform probability distribution calculation on the similarity matrix, to obtain a probability matrix.

The similarity matrix includes a plurality of similarities. The probability distribution calculation is performed on the similarity matrix to obtain the probability matrix. The probability matrix includes a probability corresponding to each similarity, and a sum of probabilities of all similarities is 1.

The probability distribution calculation may be performed in a plurality of manners. In an embodiment, calculation is performed on the similarity matrix using a softmax (a normalized index) function 1024 to obtain a probability matrix corresponding to the similarity matrix. Alternatively, for each position in the similarity matrix, a ratio of a similarity in the position to a sum of all similarities in the similarity matrix is obtained to obtain a probability corresponding to the similarity in the position, thereby obtaining a probability corresponding to the similarity in each position, to form the probability matrix using the obtained probabilities.

305: Obtain the first target sentence matrix according to the second memory matrix and the probability matrix.

The first target sentence matrix is obtained according to the second memory matrix and the probability matrix in a plurality of manners. In an embodiment, referring to FIG. 7, the probability matrix is multiplied by the second memory matrix at 1025 to obtain the first target sentence matrix 703 having a size equal to the size of a sentence matrix of the target paragraph.

The first target sentence matrix is used for describing the target paragraph according to an association relationship between the original vector set and the memory vector set. The association relationship may include a higher similarity between the sentence in the target paragraph and the context sentence indicates a greater probability. Therefore, a sentence having a higher similarity to the context sentence may be memorized in an enhancing manner by multiplying the probability matrix by the second memory matrix. More attention is paid to the sentence in the subsequent processing process, which is equivalent to obtaining the first target sentence matrix using an attention mechanism, so that the target paragraph is described more accurately using the first target sentence matrix.

For example, if the original vector set includes sentence vectors of J sentences of the target paragraph, the memory vector set includes word vectors of K sentences of context sentences, and J and K are positive integers, a matrix X corresponding to the original vector set is a matrix of J*D, a matrix M corresponding to the memory vector set is a matrix of K*D, and D is a quantity of dimensions of the sentence vectors. The two matrices are inputted into the memory layer. The first target sentence matrix obtained by performing steps 302 to 305 is $O=\text{Softmax}(X\Phi_1(M)^T)\Phi_2(M)$, $\Phi_1(M)$ being the first memory matrix, $\Phi_2(M)$ being the second memory matrix.

306: Obtain a linear value corresponding to the original vector set in the gated layer using a linear network model, and process the linear value using a preset function to obtain a first weight of the original vector set, to make the first weight fall within a preset value range.

The input layer inputs the original vector set into the gated layer. The memory layer inputs the first target sentence matrix into the gated layer. In the gated layer, processing is performed according to the original vector set and the first target sentence matrix, and a proportion of the first target sentence matrix memorized in the enhancing manner to the original vector set is adjusted, to adjust a proportion of a sentence, in the target paragraph, having a relatively high similarity to the context sentence.

Figure 8:
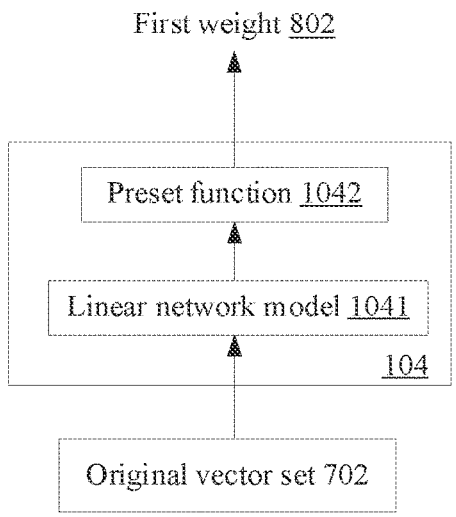
FIG. 8 is a schematic structural diagram of a gated layer according to an embodiment of this disclosure.

Referring to FIG. 8, the linear value corresponding to the original vector set 702 is obtained in the gated layer 104 using the linear network model 1041. The linear network model 1041 may be a linear neural network model, or may be another linear network model. After linear processing is performed on the original vector set 702, the original vector set 702 can be described using the obtained linear value.

After the linear value is obtained, the linear value is processed using the preset function 1042, to obtain the first weight 802 of the original vector set 702. The preset function 1042 is used for compressing the linear value to a preset value range, to make the obtained first weight fall within to the preset value range. The preset function 1042 may be a sigmoid (a non-linear effect of a neuron) function or another function. The preset value range may be a value range from 0 to 1, and the first weight 802 is greater than 0 and less than 1.

307: Determine a second weight of the first target sentence matrix according to the first weight.

The first weight is a weight of the original vector set. The second weight is a weight of the first target sentence matrix. A sum of the first weight and the second weight is 1. After the first weight is obtained, the second weight is determined according to the first weight.

308: Perform a weighted summation on the original vector set and the first target sentence matrix according to the first weight and the second weight, to obtain the second target sentence matrix.

Figure 9:
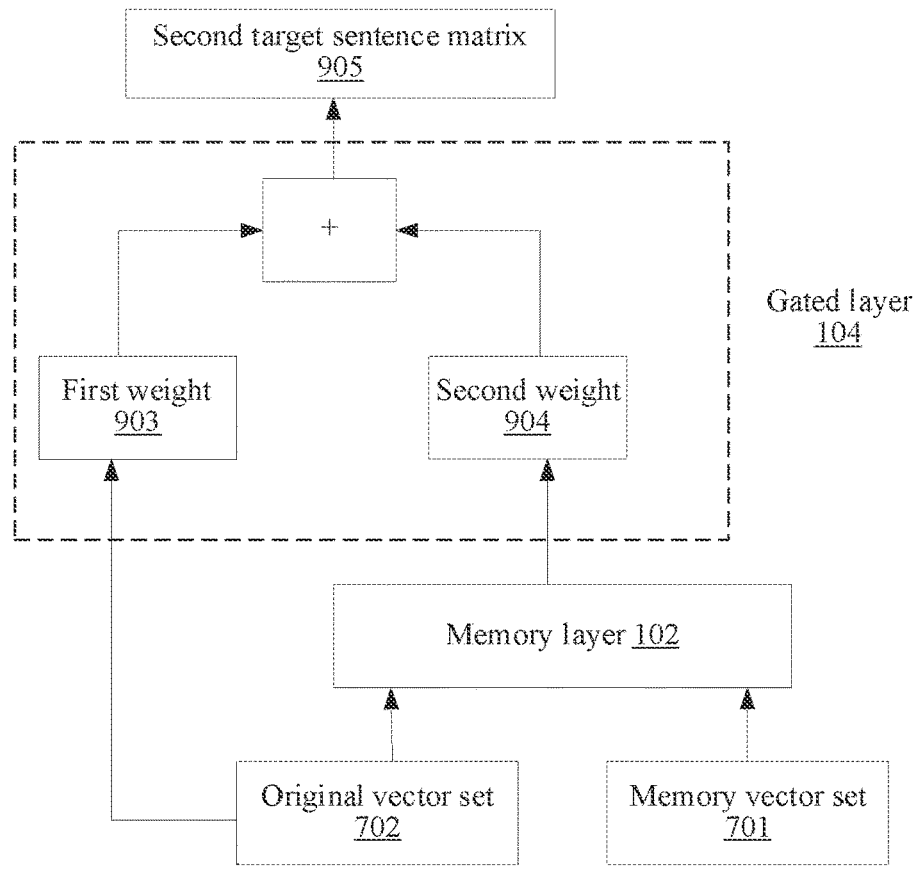
FIG. 9 is a schematic structural diagram of a memory encoding model according to an embodiment of this disclosure.

Referring to FIG. 9, the sentence vectors in the original vector set are combined to obtain the original sentence matrix of the target paragraph. The first weight 903 is the weight of the original sentence matrix. The second weight 904 is the weight of the first target sentence matrix. The weighted summation is performed on the original sentence matrix and the first target sentence matrix according to the first weight 903 and the second weight 904 to obtain the second target sentence matrix 905, to make each value in the second target sentence matrix fall within a preset value range.

In an embodiment, the weighted summation is performed using the following formula:

$$O'=G*X+(1-G)*O,$$

where O' is the second target sentence matrix, G is the first weight, X is the original sentence matrix of the target paragraph, and O is the first target sentence matrix.

Information learned after the memory enhancement may be screened using the gated layer. A proportion of the target paragraph to the context sentence is adjusted. A flow of the information is controlled, to avoid adding excessive information unrelated to the target paragraph.

309: Obtain a paragraph vector of the target paragraph in the output layer according to the second target sentence matrix.

In the output layer, the second target sentence matrix is transformed into a vector for use as the paragraph vector of the target paragraph. The paragraph vector may be obtained in a plurality of manners. In an embodiment, a column-wise summation is performed on the second target sentence matrix. That is, the second target sentence matrix is divided into a plurality of column vectors, and a sum of values in each column vector is calculated, to obtain a total value of each column vector. A vector is formed using total values of the plurality of column vectors, to obtain the paragraph vector.

Figure 10:
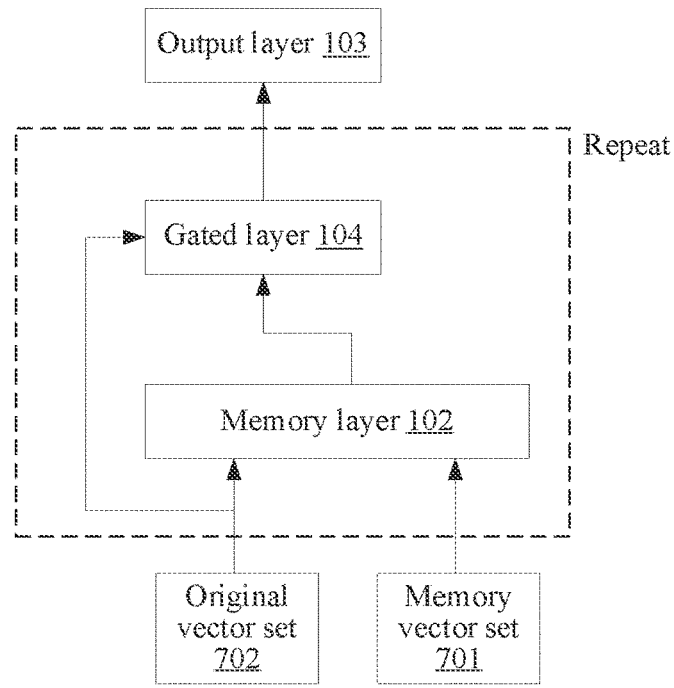
FIG. 10 is a schematic structural diagram of a memory encoding model according to an embodiment of this disclosure.

Referring to FIG. 10, in this embodiment of this disclosure, description is made using an example in which the memory layer 102 and the gated layer 104 are run only once. But in another embodiment, the memory layer 102 and the gated layer 104 may also be run repeatedly. That is, after the second target sentence matrix is obtained from the gated layer, the second target sentence matrix is used as an updated original vector set and an updated memory vector set. In the memory layer 102 and the gated layer 104, a step of obtaining a target sentence matrix according to the updated original vector set and the updated memory vector set is repeated until a quantity of repetitions reaches a preset quantity. A current target sentence matrix is inputted into the output layer 103. The paragraph vector of the target paragraph is obtained in the output layer according to the current target sentence matrix. The preset quantity may be determined as required. Alternatively, a preferred value may be determined through a test. The preset quantity may be 2, 3, or the like.

In this embodiment of this disclosure, description is made using an example in which the memory encoding model includes the gated layer. However, in another embodiment, the memory encoding model does not include the gated layer, and steps 305 to 308 are skipped. After the first target sentence matrix is obtained from the memory layer, the first target sentence matrix is inputted to the output layer. The paragraph vector of the target paragraph is obtained in the output layer according to the first target sentence matrix.

In an embodiment, a column-wise summation is performed on the first target sentence matrix, to obtain a vector for use as the paragraph vector of the target paragraph.

Where the memory encoding model does not include the gated layer, the memory layer may be further run repeatedly. That is, after the first target sentence matrix is obtained from the memory layer, the first target sentence matrix is used as an updated original vector set and an updated memory vector set. In the memory layer, a step of obtaining a target sentence matrix according to the updated original vector set and the updated memory vector set is repeated until a quantity of repetitions reaches a preset quantity. A current target sentence matrix is inputted into the output layer. The paragraph vector of the target paragraph is obtained in the output layer according to the current target sentence matrix. The preset quantity may be determined as required. Alternatively, a preferred value may be determined through a test. The preset quantity may be 2, 3, or the like.

310: Process the paragraph vector.

After the paragraph vector of the target paragraph is obtained, the paragraph vector is to be processed. In different scenarios, the paragraph vector is processed in different manners. A specific processing manner may be obtained as required. For example, in the scenario of the smart dialog, the target paragraph is the text message inputted by the user. After a paragraph vector of the target paragraph is obtained, a matched reply message is obtained according to the paragraph vector, so that a reply meeting a user requirement can be given for the text message inputted by the user.

In the encoding method provided in the embodiments of this disclosure, a memory encoding model is provided. The memory encoding model includes an input layer, a memory layer, and an output layer. A target paragraph and a context sentence of the target paragraph are obtained. The target paragraph and the context sentence are inputted into a memory encoding model. An original vector set of the target paragraph and a memory vector set in the context sentence of the target paragraph are obtained in the input layer. A first target sentence matrix of the original vector set is obtained in the memory layer according to the original vector set and the memory vector set. A paragraph vector of the target paragraph is obtained in the output layer according to the first target sentence matrix. The paragraph vector is processed. In this embodiment of this disclosure, each sentence does not need to be encoded respectively in a serial manner, and the target paragraph is encoded using the memory encoding model and using the target paragraph as a unit. Therefore, an encoding speed is improved. In addition, not only the target paragraph is considered, but also the context sentence of the target paragraph is also considered during the encoding. The paragraph vector with which the target paragraph is described accurately can be obtained according to an association relationship between the sentence in the target paragraph and the context sentence, to improve an accuracy rate of the encoding.

The memory encoding model provided in this embodiment of this disclosure has self-attention. A self-attention mechanism is applied to a sentence level of a paragraph, so that comprehensive processing is performed according to the target paragraph and the context sentence, to ensure that the paragraph vector expression of the target paragraph can be richer, and the meaning of the target paragraph can be described more accurately. In addition, this embodiment of this disclosure may be applied to a plurality of scenarios with a wide range of applications.

This embodiment of this disclosure provides a network architecture of a memory encoding model. The target paragraph may be encoded using the memory encoding model. In addition, the encoding method provided in the foregoing embodiment may be applied to an encoding process, or may be applied to a process of training the memory encoding model.

That is, in an embodiment, in the process of training the memory encoding model, an initialized memory encoding model is obtained, or a memory encoding model that has been trained once or for a plurality of times but that of which the accuracy has not met a requirement is obtained. In addition, one or more sample paragraphs are obtained for use as one or more target paragraphs. The target paragraph is processed using a current memory encoding model, and the encoding method provided in the foregoing embodiment is performed in the processing process to obtain the paragraph vector of the target paragraph.

Next, the paragraph vector of the target paragraph is decoded to obtain a test paragraph corresponding to the paragraph vector. A model parameter in the memory encoding model is corrected according to an error between the target paragraph and the test paragraph. There are a plurality of decoding manners. For example, the paragraph vector may be decoded using a decoding algorithm, or the paragraph vector is decoded using a decoding model. The decoding model may be a recurrent neural network model, a deep learning network model, a convolutional neural network model, or the like.

After training is performed once or a plurality of times in the foregoing manner, the model parameter in the memory encoding model may be determined, to obtain a memory encoding model having accuracy meeting a requirement.

However, in another embodiment, the memory encoding model has been trained, and an accuracy rate of the model meets the requirement. The memory encoding model is obtained. When a specific target paragraph is to be encoded, the target paragraph is processed using the memory encoding model. The encoding method provided in the foregoing embodiment is performed during the processing process to obtain the paragraph vector of the target paragraph. The memory encoding model may be trained by an encoding device, or transmitted to the encoding device after training by a training device. The training device may also be a terminal, a server, or the like.

Figure 11:
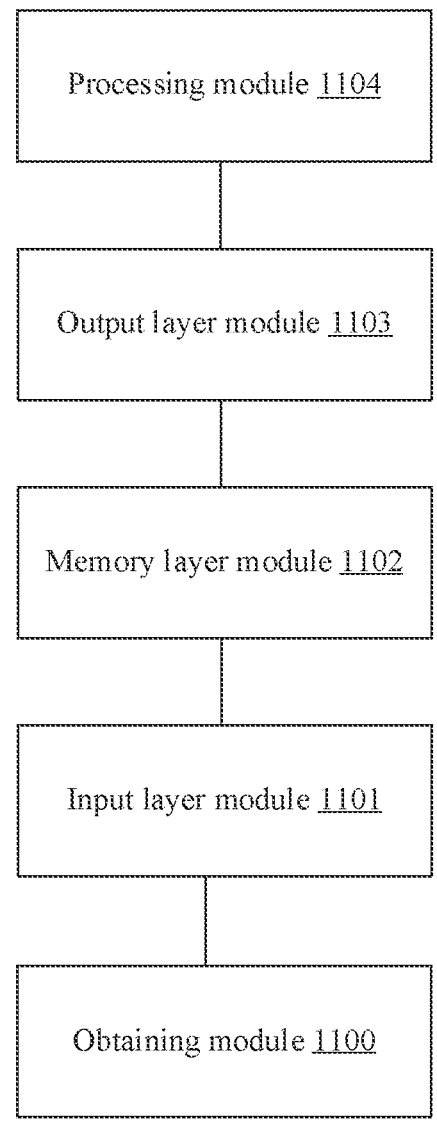
FIG. 11 is a schematic structural diagram of an encoding apparatus according to an embodiment of this disclosure.

FIG. 11 is a schematic structural diagram of an encoding apparatus according to an embodiment of this disclosure. The apparatus may be disposed in an encoding device. All or some of the modules or units included in the apparatus may be implemented entirely or partly by software, hardware, or a combination thereof. Referring to FIG. 11, the apparatus includes: an obtaining module 1100, an input layer module 1101, a memory layer module 1102, an output layer module 1103, and a processing module 1104.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The obtaining module 1100 is configured to: obtain a target paragraph and a context sentence of the target paragraph, and input the target paragraph and the context sentence into a memory encoding model, the target paragraph including at least one sentence.

The input layer module 1101 is configured to obtain an original vector set and a memory vector set of the target paragraph, the original vector set including a sentence vector of each sentence in the target paragraph, the memory vector set including a word vector of each word in the context sentence of the target paragraph.

The memory layer module 1102 is configured to obtain a first target sentence matrix of the original vector set according to the original vector set and the memory vector set, the first target sentence matrix being used for describing the target paragraph according to an association relationship between the original vector set and the memory vector set.

The output layer module 1103 is configured to obtain a paragraph vector of the target paragraph according to the first target sentence matrix.

The processing module 1104 is configured to process the paragraph vector.

In the encoding apparatus provided in the embodiments of this disclosure, the obtaining module obtains the target paragraph and the context sentence of the target paragraph, and inputs the target paragraph and the context sentence into a memory encoding model. The input layer module obtains the original vector set of the target paragraph and the memory vector set in the context sentence of the target paragraph. The memory layer module obtains the first target sentence matrix of the original vector set according to the original vector set and the memory vector set. The output layer module obtains a paragraph vector of the target paragraph according to the first target sentence matrix. The processing module processes the paragraph vector. In this embodiment of this disclosure, each sentence does not need to be encoded respectively in a serial manner, and the target paragraph is encoded using the encoding apparatus and using the target paragraph as a unit. Therefore, an encoding speed is improved. In addition, not only the target paragraph is considered, but also the context sentence of the target paragraph is also considered during the encoding. The paragraph vector with which the target paragraph is described accurately can be obtained according to an association relationship between the sentence in the target paragraph and the context sentence, to improve an accuracy rate of the encoding.

The memory encoding model provided in this embodiment of this disclosure has self-attention. A self-attention mechanism is applied to a sentence level of a paragraph, so that comprehensive processing is performed according to the target paragraph and the context sentence, to ensure that the paragraph vector expression of the target paragraph can be richer, and the meaning of the target paragraph can be described more accurately. In addition, this embodiment of this disclosure may be applied to a plurality of scenarios with a wide range of applications.

In an embodiment, the input layer module 1101 includes:
a first obtaining unit, configured to obtain the sentence vector of each sentence according to a word vector of each word in each sentence in the target paragraph using the sentence encoding model, to obtain the original vector set, and
a second obtaining unit, configured to obtain the memory vector set according to the word vector of each word in the context sentence.

In an embodiment, the sentence encoding model includes a first sentence encoding submodel and a second sentence encoding submodel; and the first obtaining unit is configured to: obtain, for each sentence in the target paragraph, the word vector of each word in the sentence, to obtain a plurality of word vectors; forward encode the plurality of word vectors using the first sentence encoding submodel, to obtain a first vector, and backward encode the plurality of word vectors using the second sentence encoding submodel, to obtain a second vector; and obtain the sentence vector of the sentence according to the first vector and the second vector.

In an embodiment, the memory layer module 1102 includes:
- a memory obtaining module, configured to obtain, using a memory model, a first memory matrix and a second memory matrix that correspond to the memory vector set; and
- a first target obtaining module, configured to obtain the first target sentence matrix of the original vector set according to the original vector set, the first memory matrix, and the second memory matrix.

In an embodiment, the first target obtaining module is configured to: obtain a similarity matrix between the original vector set and the first memory matrix; perform probability distribution calculation on the similarity matrix, to obtain a probability matrix; and obtain the first target sentence matrix according to the second memory matrix and the probability matrix.

In an embodiment, the apparatus further includes a gated layer module.

The gated layer module is configured to perform a weighted summation on the original vector set and the first target sentence matrix to obtain a second target sentence matrix, to make each value in the second target sentence matrix fall within a preset value range.

The output layer module 1103 is further configured to obtain the paragraph vector of the target paragraph according to the second target sentence matrix.

In an embodiment, the gated layer module includes:
- a first weight obtaining unit, configured to: obtain a linear value corresponding to the original vector set using a linear network model; and process the linear value using a preset function to obtain a first weight of the original vector set, to make the first weight fall within a preset value range;
- a second weight obtaining unit, configured to determine a second weight of the first target sentence matrix according to the first weight; and
- a weighting unit, configured to perform a weighted summation on the original vector set and the first target sentence matrix according to the first weight and the second weight, to obtain the second target sentence matrix.

In an embodiment, the output layer module 1103 includes:
- a column-wise summation unit, configured to perform a column-wise summation on the first target sentence matrix, to obtain the paragraph vector.

In an embodiment, the memory layer module 1102 is further configured to: use the first target sentence matrix as an updated original vector set and an updated memory vector set; repeat the operation of obtaining a target sentence matrix according to the updated original vector set and the updated memory vector set until a quantity of repetitions reaches a preset quantity, to trigger the output layer module 1103.

The output layer module 1103 is further configured to obtain the paragraph vector of the target paragraph according to a current target sentence matrix.

When the encoding apparatus provided in the foregoing embodiment encodes a paragraph, only divisions of the foregoing functional modules are described using an example. During actual application, the foregoing functions may be allocated to and completed by different functional modules according to requirements, that is, the internal structure of the encoding device is divided into different functional modules, to complete all or some of the foregoing described functions. Moreover, the embodiments of the encoding apparatus provided in the foregoing embodiments belong to the same concept as that of the embodiments of the encoding method. For details of a specific implementation process thereof, refer to the embodiments described herein.

Figure 12:
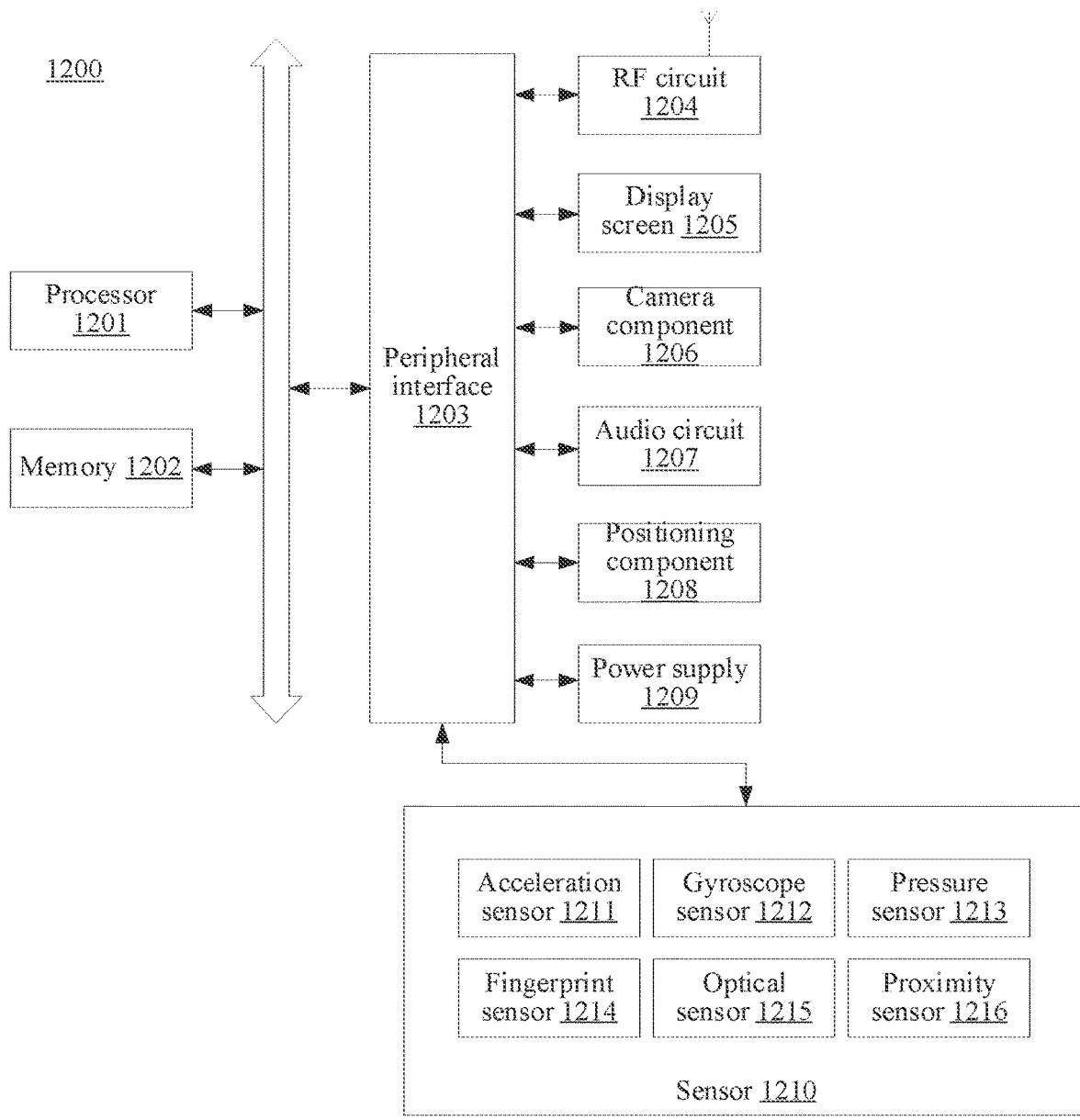
FIG. 12 is a structural block diagram of a terminal according to an embodiment of this disclosure.

FIG. 12 is a structural block diagram of a terminal according to an embodiment of this disclosure. A terminal 1200 is configured to perform the steps performed by the encoding device in the foregoing device, and may be a portable mobile terminal, for example, a smartphone, a tablet computer, a moving picture experts group audio layer III (MP3) player, a moving picture experts group audio layer IV (MP4) player, a notebook computer, or a desktop computer. The terminal 1200 may also be referred to as other names such as user equipment, a portable terminal, a laptop terminal, or a desktop terminal.

Generally, the terminal 1200 includes a processor 1201 and a memory 1202.

The processor 1201 may include one or more processing cores, for example, a 4-core processor or an 8-core processor. The processor 1201 may be implemented using at least one hardware form of a digital signal processor (DSP), a field-programmable gate array (FPGA), and a programmable logic array (PLA). The processor 1201 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1201 may be integrated with a graphics processing unit (GPU). The GPU is responsible for rendering and drawing content to be displayed by a display screen. In some embodiments, the processor 1201 may further include an artificial intelligence (AI) processor. The AI processor is configured to process a calculation operation related to machine learning.

The memory 1202 may include one or more computer-readable storage media that may be non-transitory. The memory 1202 may further include a high-speed random access memory, and a non-volatile memory such as one or more magnetic disk storage devices and a flash storage device. In some embodiments, the non-transient computer-readable storage medium in the memory 1202 is configured to store at least one computer-readable instruction, and the at least one computer-readable instruction is configured to be executed by the processor 1201 to implement the encoding method provided in the method embodiments of this disclosure.

In some embodiments, the terminal 1200 may optionally include: a peripheral interface 1203 and at least one peripheral. The processor 1201, the memory 1202, and the peripheral interface 1203 may be connected using a bus or a signal cable. Each peripheral may be connected to the peripheral interface 1203 using a bus, a signal cable, or a circuit board. Specifically, the peripheral includes: at least one of a radio frequency (RF) circuit 1204, a touch display screen 1205, a camera component 1206, an audio circuit 1207, a positioning component 1208, and a power supply 1209.

The peripheral interface 1203 may be configured to connect the at least one peripheral related to input/output (I/O) to the processor 1201 and the memory 1202.

The RF circuit 1204 is configured to receive and transmit an RF signal, also referred to as an electromagnetic signal.

The display screen 1205 is configured to display a user interface (UI). The UI may include a graph, text, an icon, a video, and any combination thereof. When the display screen 1205 is a touch display screen, the display screen 1205 also has the capability to collect a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard.

The camera component 1206 is configured to capture an image or a video. Optionally, the camera component 1206 includes a front-facing camera and a rear-facing camera. Generally, the front-facing camera is disposed on a front panel of the terminal, and the rear-facing camera is disposed on a back surface of the terminal.

The audio circuit 1207 may include a microphone and a speaker. The microphone is configured to collect sound waves of a user and an environment, and convert the sound waves into electric signals and input the electric signals into the processor 1201 for processing, or input the electric signals into the RF circuit 1204 to implement speech communication. The speaker is configured to convert electric signals from the processor 1201 or the RF circuit 1204 into sound waves. The speaker may be a conventional thin-film speaker or a piezoelectric ceramic speaker.

The positioning component 1208 is configured to position a current geographic location of the terminal 1200 for implementing navigation or a location-based service (LBS).

The power supply 1209 is configured to supply power to components in the terminal 1200. The power supply 1209 may be an alternating current, a direct current, a primary battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In some embodiments, the terminal 1200 may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established with the terminal 1200. The gyroscope sensor 1212 may detect a body direction and a rotation angle of the terminal 1200. The gyroscope sensor 1212 may work with the acceleration sensor 1211 to acquire a 3D action performed by the user on the terminal 1200. The pressure sensor 1213 may be disposed on a side frame of the terminal 1200 and/or a lower layer of the touch display screen 1205. The fingerprint sensor 1214 is configured to collect a fingerprint of a user. The processor 1201 identifies an identity of the user according to the fingerprint collected by the fingerprint sensor 1214, or the fingerprint sensor 1214 identifies an identity of the user according to the collected fingerprint. The optical sensor 1215 is configured to collect ambient light intensity. The proximity sensor 1216, also referred to as a distance sensor, is usually disposed on the front panel of the terminal 1200. The proximity sensor 1216 is configured to collect a distance between the user and the front surface of the terminal 1200.

A person skilled in the art may understand that the structure shown in FIG. 12 constitutes no limitation on the terminal 1200, and the terminal may include more or fewer components than those shown in the figure, or some components may be combined, or a different component deployment may be used.

Figure 13:
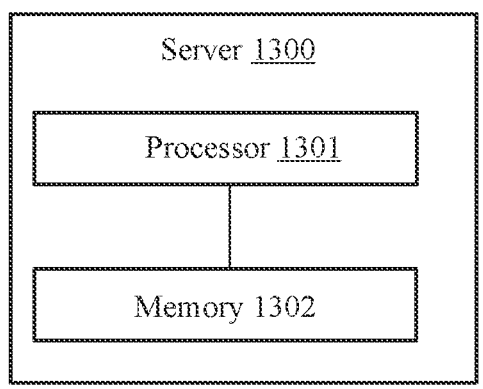
FIG. 13 is a schematic structural diagram of a server according to an embodiment of this disclosure.

FIG. 13 is a schematic structural diagram of a server according to an embodiment of this disclosure. The server 1300 may vary greatly due to different configurations or performance, and may include one or more processors (CPUs) 1301 and one or more memories 1302. The memory 1302 stores at least one computer-readable instruction, the at least one computer-readable instruction being loaded and executed by the processor 1301 to implement the encoding method provided in the foregoing method embodiments. Certainly, the server can also have a wired or wireless network interface, a keyboard, an I/O interface and other components to facilitate I/O. The server can also include other components for implementing device functions as in the other embodiments described herein.

The server 1300 may be configured to perform the steps performed by the encoding device in the encoding method provided in the foregoing embodiments.

It is to be understood that, although the steps are displayed sequentially according to the instructions of the arrows in the flowcharts of the embodiments, the steps are not necessarily performed sequentially according to the sequence instructed by the arrows. Unless otherwise explicitly specified in this specification, execution of the steps is not strictly limited, and the steps may be performed in other orders. Moreover, at least a part of the steps in the foregoing embodiments may include a plurality of sub-steps or a plurality of stages. The sub-steps or stages are not necessarily performed at the same moment, but may be performed at different moments. The sub-steps or stages are not necessarily performed successively in order, but may be performed in turn or alternately with at least a part of other steps or sub-steps or stages of other steps.

The embodiments of this disclosure further provide an encoding device, including one or more processors and one or more memories, the one or more memories storing at least one computer-readable instruction, at least one program, a code set, or a computer-readable instruction set, the computer-readable instruction, the program, the code set, or the computer-readable instruction set being loaded and executed by the one or more processors to implement the operations performed in the encoding method in the foregoing embodiments.

The embodiments of this disclosure further provide a computer-readable storage medium, storing at least one computer-readable instruction, at least one program, a code set, or a computer-readable instruction set, the computer-readable instruction, the program, the code set, or the computer-readable instruction set being loaded and executed by one or more processors to implement the operations performed in the encoding method in the foregoing embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely embodiments of this disclosure, but are not intended to limit this disclosure. Any modification, equivalent replacement, or improvement made within the spirit and principle of this disclosure shall fall within the protection scope of this disclosure.

What is claimed is:

1. An encoding method, performed by an encoding device, characterized in that the method comprises:

receiving a target paragraph and a context sentence of the target paragraph from a specific user scenario, the context sentence comprising a sentence in one or more paragraphs before the target paragraph in the specific user scenario, a sentence in one or more paragraphs after the paragraph in the specific user scenario, or a sentence in the target paragraph;

inputting the target paragraph and the context sentence into a memory encoding model, the target paragraph comprising at least one sentence, the memory encoding model comprising at least an input layer, a memory layer, and an output layer;

generating an original vector set and a memory vector set of the target paragraph in the input layer, the original vector set comprising a respective sentence vector of each sentence in the target paragraph, the memory vector set comprising a respective word vector of each word in the context sentence of the target paragraph;

determining a first target sentence matrix of the original vector set in the memory layer according to the original vector set and the memory vector set, the first target sentence matrix describing the target paragraph according to a relationship between the original vector set and the memory vector set;

obtaining a paragraph vector of the target paragraph in the output layer according to the first target sentence matrix; and processing the paragraph vector to generate an output result associated with the target paragraph for the specific user scenario.

2. The method of claim 1, characterized in that the input layer comprises a sentence encoding model, and the step of obtaining the original vector set and the memory vector set of the target paragraph in the input layer further comprises:

obtaining the original vector set by obtaining the respective sentence vector of each sentence by the sentence encoding model according to a respective word vector of each word in each sentence in the target paragraph; and obtaining the memory vector set according to the respective word vector of each word in the context sentence.

3. The method of claim 2, characterized in that the sentence encoding model comprises a first sentence encoding submodel and a second sentence encoding submodel, and the step of obtaining the respective sentence vector of each sentence by the sentence encoding model according to the respective word vector of each word in each sentence in the target paragraph to thereby obtain the original vector set further comprises:

obtaining, for each sentence in the target paragraph, a respective word vector of each word in the sentence, to obtain a plurality of word vectors;

encoding, in forward order, the plurality of word vectors by the first sentence encoding submodel, to obtain a first vector, and encoding, in reverse order, the plurality of word vectors by the second sentence encoding submodel, to obtain a second vector; and obtaining the sentence vector of the sentence according to the first vector and the second vector.

4. The method of claim 1, characterized in that the memory layer comprises a memory model, and the step of obtaining the first target sentence matrix of the original vector set in the memory layer according to the original vector set and the memory vector set further comprises:

obtaining a first memory matrix and a second memory matrix that correspond to the memory vector set by the memory model; and obtaining the first target sentence matrix of the original vector set according to the original vector set, the first memory matrix, and the second memory matrix.

5. The method of claim 4, characterized in that the memory vector set is the same as the original vector set, and the step of obtaining the first target sentence matrix of the original vector set according to the original vector set, the first memory matrix, and the second memory matrix further comprises:

obtaining a similarity matrix between the original vector set and the first memory matrix;

performing probability distribution calculation on the similarity matrix, to obtain a probability matrix; and obtaining the first target sentence matrix according to the second memory matrix and the probability matrix.

6. The method of claim 1, characterized in that the memory encoding model further comprises a gated layer, and the step of obtaining the paragraph vector of the target paragraph in the output layer according to the first target sentence matrix further comprises:

performing a weighted summation on the original vector set and the first target sentence matrix in the gated layer to obtain a second target sentence matrix such that each value in the second target sentence matrix each fall within a planned value range; and obtaining the paragraph vector of the target paragraph in the output layer according to the second target sentence matrix.

7. The method of claim 6, characterized in that the gated layer comprises a linear network model, and the step of performing a weighted summation on the original vector set and the first target sentence matrix in the gated layer to obtain the second target sentence matrix further comprises:

obtaining a linear value corresponding to the original vector set by the linear network model, and processing the linear value by a planned function to obtain a first weight of the original vector set, such that the first weight of the original vector set falls within a planned value range;

determining a second weight of the first target sentence matrix according to the first weight; and performing a weighted summation on the original vector set and the first target sentence matrix according to the first weight and the second weight, to obtain the second target sentence matrix.

8. The method of claim 1, characterized in that the step of obtaining the paragraph vector of the target paragraph in the output layer according to the first target sentence matrix further comprises:

performing a column-wise summation on the first target sentence matrix, to obtain the paragraph vector.

9. The method of claim 1, characterized in that the method further comprises:

using the first target sentence matrix as an updated original vector set and an updated memory vector set, upon having repeatedly performed the step of obtaining a first target sentence matrix of the original vector set in the memory layer according to the original vector set and the memory vector set until the number of iterations reaches a predetermined number, obtaining the paragraph vector of the target paragraph in the output layer according to the current first target sentence matrix.

10. An encoding apparatus provided in encoding equipment, characterized in that that apparatus comprises:
an obtaining module for receiving a target paragraph and a context sentence of the target paragraph from a specific user scenario, the context sentence including a sentence in one or more paragraphs before the target paragraph in the specific user scenario, a sentence in one or more paragraphs after the paragraph in the specific user scenario, or a sentence in the target paragraph, and inputting the target paragraph and the context sentence into a memory encoding model, the target paragraph comprising at least one sentence;
an input layer module for generating an original vector set and a memory vector set of the target paragraph in the input layer, the original vector set comprising a respective sentence vector of each sentence in the target paragraph, the memory vector set comprising a respective word vector of each word in the context sentence of the target paragraph;
a memory layer module for determining a first target sentence matrix of the original vector set in the memory layer according to the original vector set and the memory vector set, the first target sentence matrix describing the target paragraph according to a relationship between the original vector set and the memory vector set;
an output layer module for obtaining a paragraph vector of the target paragraph in the output layer according to the first target sentence matrix; and
a processing module for processing the paragraph vector to generate an output result associated with the target paragraph for the specific user scenario.

11. The apparatus of claim 10, characterized in that the input layer module is further used for:
obtaining the original vector set by obtaining the respective sentence vector of each sentence by the sentence encoding model according to a respective word vector of each word in each sentence in the target paragraph; and
obtaining the memory vector set according to the respective word vector of each word in the context sentence.

12. The apparatus of claim 11, characterized in that the sentence encoding model comprises a first sentence encoding submodel and a second sentence encoding submodel, and
the input layer module is further used for:
obtaining, for each sentence in the target paragraph, a respective word vector of each word in the sentence, to obtain a plurality of word vectors;
encoding, in forward order, the plurality of word vectors by the first sentence encoding submodel, to obtain a first vector, and encoding, in reverse order, the plurality of word vectors by the second sentence encoding submodel, to obtain a second vector; and
obtaining the sentence vector of the sentence according to the first vector and the second vector.

13. The apparatus of claim 10, characterized in that the memory layer module comprises a memory model, and the memory layer module comprises:
a memory obtaining unit for obtaining a first memory matrix and a second memory matrix that correspond to the memory vector set by the memory model; and
a first target obtaining unit for obtaining the first target sentence matrix of the original vector set according to the original vector set, the first memory matrix, and the second memory matrix.

14. The apparatus of claim 13, characterized in that the memory vector set is the same as the original vector set, and the first target obtaining unit is used for:
obtaining a similarity matrix between the original vector set and the first memory matrix;
performing probability distribution calculation on the similarity matrix, to obtain a probability matrix; and
obtaining the first target sentence matrix according to the second memory matrix and the probability matrix.

15. The apparatus of claim 10, characterized in that the apparatus further comprises a gated layer module,
wherein the gated layer module is for performing a weighted summation on the original vector set and the first target sentence matrix to obtain a second target sentence matrix such that each value in the second target sentence matrix each fall within a planned value range; and
the output layer module is further used for obtaining the paragraph vector of the target paragraph according to the second target sentence matrix.

16. The apparatus of claim 15, characterized in that the gated layer module is used for:
obtaining a linear value corresponding to the original vector set by the linear network model, and processing the linear value by a planned function to obtain a first weight of the original vector set, such that the first weight of the original vector set falls within a planned value range;
determining a second weight of the first target sentence matrix according to the first weight; and
performing a weighted summation on the original vector set and the first target sentence matrix according to the first weight and the second weight, to obtain the second target sentence matrix.

17. The apparatus of claim 11, characterized in that the output layer module is further used for performing a column-wise summation on the first target sentence matrix, to obtain the paragraph vector.

18. The apparatus of claim 10, characterized in that the memory layer module is further used for using the first target sentence matrix as an updated original vector set and an updated memory vector set, upon having repeatedly performed the step of obtaining a first target sentence matrix of the original vector set according to the original vector set and the memory vector set until the number of iterations reaches a predetermined number, notifying to the output layer module to obtain the paragraph vector of the target paragraph according to the current first target sentence matrix.

19. A non-transitory machine-readable media, having instructions stored on the machine-readable media, the instructions configured to, when executed, cause a machine to:
receive a target paragraph and a context sentence of the target paragraph from a specific user scenario, the context sentence comprising a sentence in one or more paragraphs before the target paragraph in the specific user scenario, a sentence in one or more paragraphs after the paragraph in the specific user scenario, or a sentence in the target paragraph;
input the target paragraph and the context sentence into a memory encoding model, the target paragraph comprising at least one sentence, the memory encoding model comprising at least an input layer, a memory layer, and an output layer;

generate an original vector set and a memory vector set of the target paragraph in the input layer, the original vector set comprising a respective sentence vector of each sentence in the target paragraph, the memory vector set comprising a respective word vector of each word in the context sentence of the target paragraph;

determine a first target sentence matrix of the original vector set in the memory layer according to the original vector set and the memory vector set, the first target sentence matrix describing the target paragraph according to a relationship between the original vector set and the memory vector set;

obtaining a paragraph vector of the target paragraph in the output layer according to the first target sentence matrix; and processing the paragraph vector to generate an output result associated with the target paragraph for the specific user scenario.

\* \* \* \* \*